(12) United States Patent
Malina et al.

(10) Patent No.: US 10,969,965 B2
(45) Date of Patent: Apr. 6, 2021

(54) DYNAMIC PERFORMANCE DENSITY TUNING FOR DATA STORAGE DEVICE

(71) Applicant: Western Digital Technologies, Inc., San Jose, CA (US)

(72) Inventors: James N. Malina, Irvine, CA (US); William B. Boyle, Lake Forest, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 192 days.

(21) Appl. No.: 16/231,748

(22) Filed: Dec. 24, 2018

(65) Prior Publication Data

US 2020/0201549 A1  Jun. 25, 2020

(51) Int. Cl.
*G06F 12/00* (2006.01)
*G06F 3/06* (2006.01)

(52) U.S. Cl.
CPC .......... *G06F 3/0611* (2013.01); *G06F 3/0638* (2013.01); *G06F 3/0659* (2013.01); *G06F 3/0674* (2013.01)

(58) Field of Classification Search
CPC .... G06F 3/0611; G06F 3/0674; G06F 3/0638; G06F 3/0659
USPC ........................................................ 711/154
See application file for complete search history.

(56) References Cited

U.S. PATENT DOCUMENTS

| | | | |
|---|---|---|---|
| 8,397,107 B1 | 3/2013 | Syu et al. | |
| 8,699,159 B1 | 4/2014 | Malina | |
| 8,817,413 B1 | 8/2014 | Knigge et al. | |
| 9,153,247 B1 | 10/2015 | Hall et al. | |
| 9,383,923 B1 | 7/2016 | Malina et al. | |
| 9,418,699 B1 | 8/2016 | Gibbons et al. | |
| 9,864,529 B1 | 1/2018 | Chen et al. | |
| 10,366,726 B1 | 7/2019 | Granz et al. | |
| 10,381,040 B1 | 8/2019 | Boyle et al. | |
| 10,424,334 B1 | 9/2019 | Xiong et al. | |
| 2013/0027802 A1 | 1/2013 | Kim | |
| 2013/0031317 A1 | 1/2013 | Ryu et al. | |
| 2014/0019680 A1 | 1/2014 | Jin et al. | |
| 2014/0055881 A1 | 2/2014 | Zaharris | |
| 2014/0201424 A1 | 7/2014 | Chen et al. | |

(Continued)

OTHER PUBLICATIONS

Pending U.S. Appl. No. 16/410,750, filed May 13, 2019, entitled "Data Storage Device Configuration", Weber et al.

(Continued)

*Primary Examiner* — Mardochee Chery
(74) *Attorney, Agent, or Firm* — Barry IP Law, P.C.

(57) ABSTRACT

A Data Storage Device (DSD) includes at least one disk for storing data in a plurality of storage areas including at least a first area type for using a first data access methodology and a second area type for using a second data access methodology. It is determined whether to perform a command in a storage area of the first or second area type. If the command is to be performed in the first area type, the command is prioritized over at least one other command for the second area type. In another aspect, a value is determined representing a number of data access operations within a predetermined time period for a data storage capacity of the DSD. Storage areas of the DSD are configured as one of at least the first area type and the second area type based at least in part on the determined value.

28 Claims, 5 Drawing Sheets

(56) References Cited

U.S. PATENT DOCUMENTS

| | | |
|---|---|---|
| 2014/0340786 A1 | 11/2014 | Xu et al. |
| 2015/0109700 A1 | 4/2015 | Kashiwase et al. |
| 2015/0237138 A1 | 8/2015 | Malina et al. |
| 2015/0339319 A1 | 11/2015 | Malina |
| 2016/0299698 A1 | 10/2016 | Hall |
| 2017/0090776 A1* | 3/2017 | Kowles ............... G06F 3/0655 |
| 2018/0260332 A1 | 9/2018 | Dunn |
| 2018/0342261 A1 | 11/2018 | Das |
| 2019/0013046 A1 | 1/2019 | Kulkarni et al. |
| 2019/0095109 A1* | 3/2019 | Zhou .................... G06F 3/0685 |
| 2019/0095321 A1* | 3/2019 | Lin ....................... G06F 3/0679 |
| 2020/0104252 A1 | 4/2020 | Subbarao |

OTHER PUBLICATIONS

Brewer et al.; "Disks for Data Centers, White paper for FAST 2016"; Feb. 23, 2016; 16 pages; Version 1.1; available at https://ai.google/research/pubs/pub44830.

Theodore Ts'o; "Hybrid-SMR Product Requirements Proposal for OCP"; Nov. 13, 2017, 3 pages; available at https://www.opencompute.org/wiki/Storage.

Timothy Feldman; "Flex"; Seagate; Dec. 11, 2017; 17 pages; available at https://www.opencompute.org/wiki/Storage.

Boyle et al., co-pending U.S. Appl. No. 16/024,211, filed Jun. 29, 2018, entitled "Dynamic Hybrid Shingled Magnetic Recording".

Office Action dated Feb. 4, 2019, from pending U.S. Appl. No. 16/024,211, filed Jun. 29, 2018, entitled "Dynamic Hybrid Shingled Magnetic Recording", William B. Boyle, et al.

* cited by examiner

DYNAMIC PERFORMANCE DENSITY TUNING FOR DATA STORAGE DEVICE

BACKGROUND

Data Storage Devices (DSDs) are often used to record data onto or to reproduce data from a storage media. One type of storage media includes a rotating magnetic disk, such as in a Hard Disk Drive (HDD). In such DSDs, a head is positioned in relation to a disk to magnetically read and write data in tracks on a surface of the disk.

Although the storage capacity of DSDs including disk media continues to increase, the performance of such DSDs in terms of a number of random input or output operations during a predetermined time period (e.g., Input/Output Operations Per Second (IOPS)) has not changed significantly. This is primarily due to certain mechanical characteristics of accessing data on a disk that have remained generally the same. Such mechanical characteristics can include, for example, a seek time for moving the head to an area of the disk to be accessed, the rate at which the disk spins, or the distance at which a head is stroked over the disk. As a result, the number of input and output operations performed for a given storage capacity (e.g., IOPS density) has declined as the storage capacities of DSDs has grown.

Although data centers may improve this metric by adding more DSDs with smaller storage capacities for parallel operation, the addition of more DSDs is less cost effective than using a fewer number of DSDs that each have a greater storage capacity. Other approaches such as using a split actuator that can move heads in different directions or using multiple actuators to move different heads independently (e.g., a dual actuator) adds significant cost to such DSDs. Approaches such as limiting the stroke distance of the actuator over the disk (i.e., de-stroking) to increase the number of operations that can be performed in a predetermined period of time waste the storage capacity of the portions of the disk that are not covered by the limited stroke distance. Accordingly, there is a need to improve the performance density of DSDs, without adding a greater number of smaller capacity DSDs, adding cost to the physical design of the DSD, or wasting storage capacity as in de-stroking.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example System Overview

Figure 1:
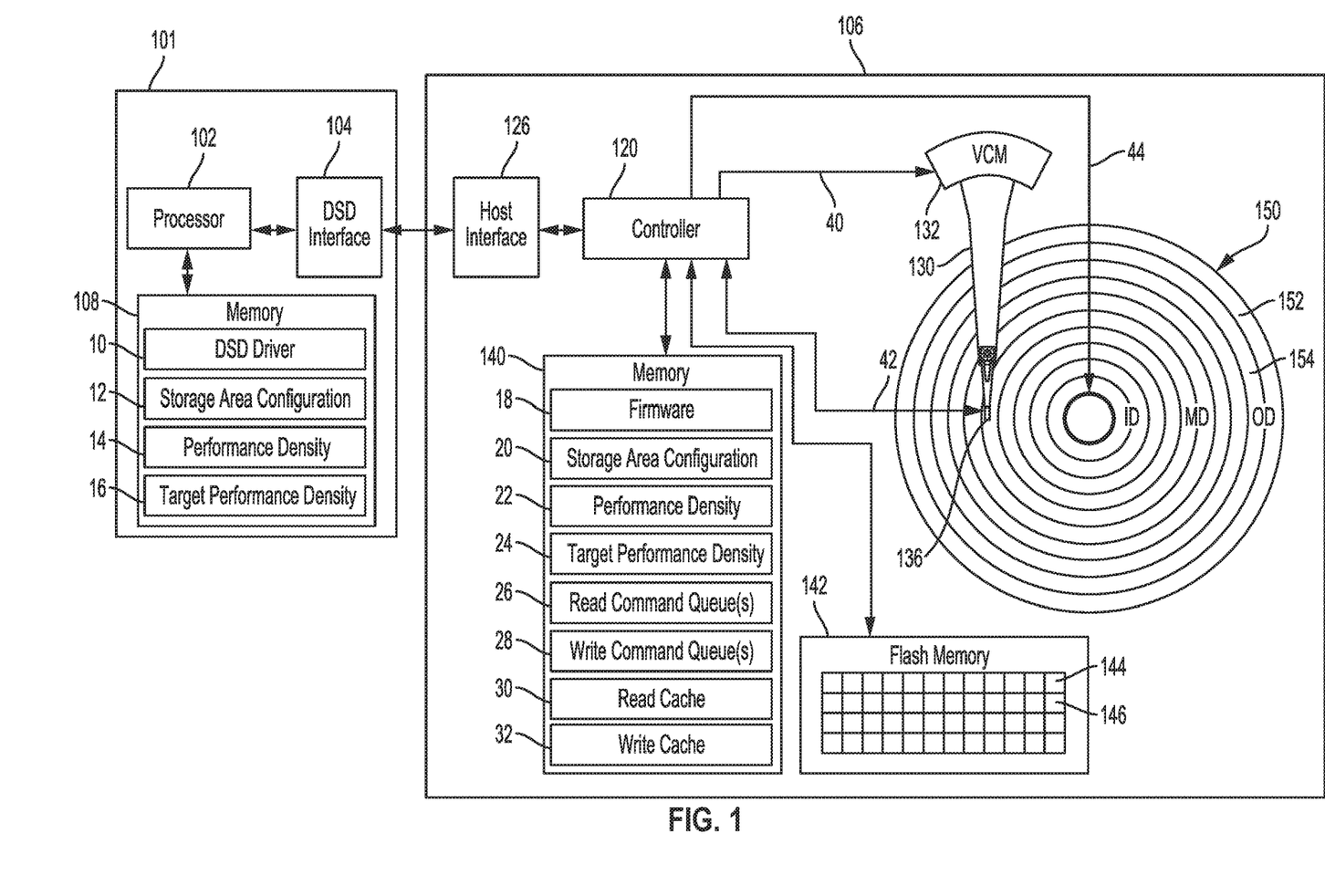
FIG. 1 is a block diagram of a Data Storage Device (DSD) and a host according to an embodiment.

FIG. 1 shows an example of Data Storage Device (DSD) 106 which communicates with host 101 according to an embodiment. Host 101 communicates with DSD 106 to retrieve data from and store data in DSD 106. In the example embodiment of FIG. 1, host 101 is separate from DSD 106, and may include, for example, a server or other computer system. In other embodiments, host 101 may be housed together with DSD 106 as part of a single electronic device, such as, for example, a desktop, laptop or notebook computer or another type of electronic device such as a tablet, smartphone, network media player, portable media player, or Digital Video Recorder (DVR). As used herein, a host can refer to a device that is capable of issuing commands to a DSD to store data or retrieve data. In this regard, host 101 may include another storage device such as a smart DSD that is capable of executing applications and communicating with other DSDs.

Host 101 includes processor 102, which can include circuitry for executing instructions, such as those of DSD driver 10. In some implementations, processor 102 can include circuitry such as, for example, one or more processor cores, a microcontroller, a Digital Signal Processor (DSP), an Application-Specific Integrated Circuit (ASIC), a Field Programmable Gate Array (FPGA), hard-wired logic, analog circuitry and/or a combination thereof. In some implementations, controller 120 can include a System on a Chip (SoC).

As shown in FIG. 1, processor 102 of host 101 communicates with memory 108, which can include, for example, a volatile Random-Access Memory (RAM) such as Dynamic RAM (DRAM), or a non-volatile RAM or other solid-state memory. Data stored in memory 108 can include, for example, instructions loaded from DSD driver 10 for execution by processor 102, storage area configuration 12 or a portion thereof, and/or data used in executing applications such as DSD driver 10. Such data can include, for example, performance density 14 and target performance density 16, as discussed in more detail below.

In FIG. 1, DSD interface 104 is configured to interface host 101 with DSD 106, and may interface according to a standard such as, for example, Serial Advanced Technology Attachment (SATA), PCI express (PCIe), Small Computer System Interface (SCSI), Serial Attached SCSI (SAS), Ethernet, or WiFi. In this regard, host 101 and DSD 106 may not be physically co-located and may communicate over a network such as a Local Area Network (LAN) or a Wide Area Network (WAN), such as the internet.

Host interface 126 is configured to interface DSD 106 with host 101, and as with DSD interface 104 of host 101, may interface according to a standard such as, for example, SATA, PCIe, SCSI, SAS, Ethernet, or WiFi. As will be appreciated by those of ordinary skill in the art, host interface 126 can be included as part of controller 120.

As shown in FIG. 1, DSD 106 includes controller 120 which includes circuitry such as one or more processors for executing instructions and can include, for example, a microcontroller, a DSP, an ASIC, an FPGA, hard-wired logic, analog circuitry and/or a combination thereof. In some implementations, controller 120 can include an SoC. Controller 120 can access memory 140 to execute instructions, such as those from firmware 18 used to control operation of DSD 106.

In the example of FIG. 1, DSD 106 includes memory 140, which can include, for example, a volatile RAM such as DRAM, or a non-volatile RAM or other solid-state memory. Memory 140 can be used by DSD 106 to store data used by controller 120. Data stored in memory 140 can include data read from disk 150 or flash memory 142, data to be stored in disk 150 or flash memory 142, instructions loaded from firmware 18 for execution by controller 120, and/or data used in executing firmware 18. Such data may include storage area configuration 20, or a portion of a storage area configuration that has been loaded into memory 140 from a Non-Volatile Memory (NVM), such as from disk 150 or flash memory 142.

In addition, memory 140 may store performance density 22, target performance density 24, one or more read command queues 26, one or more write command queues 28, read cache 30, and write cache 32. As discussed in more detail below with reference to FIGS. 2 and 3, a target performance density can be used to prioritize performance of commands in a storage area of disk 150 or flash memory 142 that is of a first area type over the performance of commands in a storage area of disk 150 or flash memory 142 that is of a second area type to move a performance density of DSD 106 toward the target performance density. Performance density 22 can represent a number of data access operations performed by DSD 106 within a predetermined period of time for a storage capacity of DSD 106. One example of such a performance density is the number of Input/Output Operations Per Second (IOPS) for a nominal or actual storage capacity of disk 150, flash memory 142, or a combined storage capacity of disk 150 and flash memory 142 (e.g., an IOPS density).

As discussed in more detail below with reference to FIG. 2, the ordering of commands in one or more read command queues 26 and/or in one or more write command queues 28 can be based at least in part on whether the commands are to be performed in storage areas of the first area type or of the second area type to move the performance density closer to the target performance density. The target performance density may also be used for determining which data is stored in read cache 30 and/or write cache 32 to move the performance density toward the target performance density. In addition, and as discussed in more detail below with reference to FIG. 4, the configuration or relative number of storage areas of the first area type to the number of storage areas of the second area type may be set or adjusted to tune to the target performance density.

Although the present disclosure refers to storage areas of a first area type or a second area type, more than two area types may be present in DSD 106 for adjusting a performance density by prioritizing commands for different area types over other area types. As discussed in more detail below, each of the different area types are configured to use different data access methodologies for reading or writing data in the area type.

In the example of FIG. 1, DSD 106 is a Solid-State Hybrid Drive (SSHD) in that it includes both a solid-state non-volatile memory (i.e., flash memory 142 in FIG. 1) and a rotating magnetic disk (i.e., disk 150 in FIG. 1) for non-volatilely storing data. In other implementations, DSD 106 may only include one of disk 150 or flash memory 142 so as to make DSD 106 a Hard Disk Drive (HDD) or a Solid-State Drive, respectively.

In the example of FIG. 1, disk 150 is rotated by a spindle motor (not shown) and head 136 is positioned to read and write data on the surface of disk 150. In more detail, head 136 is connected to the distal end of actuator 130 which is rotated by Voice Coil Motor (VCM) 132 to position head 136 over disk 150 to read or write data in tracks. A servo system (not shown) of controller 120 controls the rotation of disk 150 with SM control signal 44 and controls the position of head 136 using VCM control signal 40.

As will be appreciated by those of ordinary skill in the art, disk 150 may form part of a disk pack including multiple disks that are radially aligned with disk 150. In such implementations, head 136 may form part of a Head Stack Assembly (HSA) including heads arranged to read data from and write data to a corresponding disk surface in the disk pack.

In operation, host interface 126 receives host read and write commands from host 101 via host interface 126 for reading data from and writing data to disk 150 or flash memory 142 of DSD 106. In response to a write command from host 101, controller 120 may determine a location for writing data for the command and buffer the data to be written for the write command in memory 140.

For data to be written on disk 150, a read/write channel (not shown) of controller 120 may encode the buffered data into write signal 42 that is provided to head 136 for magnetically writing data on disk 150. A servo system of controller 120 can provide VCM control signal 40 to VCM 132 to position head 136 over a particular track for writing the data.

To read data from disk 150, the servo system positions head 136 over a particular track, and controller 120 controls head 136 to magnetically read data stored in the track and send the read data as read signal 42. A read/write channel of controller 120 can then decode and buffer the data into memory 140 for transmission to host 101 via host interface 126.

As shown in FIG. 1, disk 150 includes storage areas on the disk surface, such as storage areas 152 and 154. The storage areas on disk 150 are concentrically laid out from an Outer Diameter (OD) portion of disk 150, through a Middle Diameter (MD) portion, to an Inner Diameter (ID) portion of disk 150. Each storage area includes tracks for storing data on disk 150. As described in more detail below, the storage areas on disk 150 can include Shingled Magnetic Recording (SMR) areas of overlapping tracks or Conventional Magnetic Recording (CMR) areas of non-overlapping tracks.

In this regard, the CMR storage areas can be viewed as a first area type for using a first data access methodology for reading or writing data in non-overlapping tracks, and the SMR storage areas can be viewed as a second area type for using a second data access methodology for reading or writing data in overlapping tracks. In such an implementation, zone 152 on disk 150 may be configured for data written in non-overlapping tracks (i.e., a first area type) and zone 154 may be configured for data written in overlapping tracks (i.e., a second area type). In other implementations, the storage areas for rotating magnetic disks may correspond to larger areas than zones on a disk surface. For example, the storage areas may include a disk surface or an entire disk that is of one area type (e.g., an SMR disk surface or a CMR disk surface).

SMR can allow for a greater storage capacity on disk 150 by increasing the number of Tracks Per Inch (TPI) on disk 150 with narrower overlapping tracks than the non-overlapping tracks used in CMR. However, the overlapping of tracks with SMR means that previously written data cannot be changed or rewritten without affecting an adjacent track. SMR zones are therefore sequentially written in one radial direction to avoid affecting previously written data in the zone.

The sequential writing in an SMR storage area can decrease the number of random (i.e., non-sequential) read and write commands that can be performed on disk 150, as compared to the number of random read and write commands that can be performed in a CMR storage area in a given period of time. In more detail, SMR typically uses address indirection to prevent having to rewrite data that is modified by leaving the old version of the data in the same location on disk 150, writing the modified version of the data in a new location on disk 150, and updating the logical to physical mapping for the modified data from the old physical address to the new physical address. This can add overhead in performing commands in an SMR zone and result in more fragmentation of the data, which can cause more seek time to access different portions of modified data in SMR zones. In some implementations, DSD 106 may prioritize commands in CMR storage areas (i.e., the first area type) over write commands in SMR storage areas (i.e., the second area type) to provide a better overall input/output performance (e.g., IOPS) for a given storage capacity (e.g., IOPS density).

In other implementations, the first area type and second area type may differ with respect to different data access methodologies other than whether tracks are written using CMR or SMR. For example, the first area type and the second area type may correspond to areas of disk 150 that use different levels of energy-assisted recording, such as, for example, Thermal Fly-Height Control (TFC), Heat Assisted Magnetic Recording (HAMR) or Microwave Assisted Magnetic Recording (MAMR).

In the example of TFC, head 136 includes a fly-height heater that heats a portion of head 136 to decrease the distance between head 136 and the surface of disk 150. As the areal density of disks increase, a fly-height of the head or the distance between the head and disk surface typically decreases to be able to read and write data in smaller or narrower tracks on the disk. For example, many modern HDDs may have a fly-height of only several nanometers. At such relatively small distances, control of the fly-height becomes more important for avoiding errors when writing and reading data due to variations in the fly-height. In many cases, the fly-height can change when a write current used to write data on the disk causes part of a slider including the head to heat up and expand or protrude toward the disk, while reading data may not cause a similar type of heating and expansion toward the disk.

In order to provide a more consistent fly-height when reading and writing data, some recent DSDs include a fly-height heater on the slider that causes a bottom surface of the slider to expand or protrude closer to the disk surface when the heater is on, and cause the bottom surface of the slider to retract away from the disk when the heater is off. The turning on of the fly-height heater may then be controlled with the writing and reading of data on the disk to provide a more consistent fly-height. For example, before writing data, the fly-height heater may be turned on at a high-power to preheat the head and then the power may be reduced as writing begins so that the fly-height of the head remains relatively the same with the heating provided by the write current during the write process. Before reading data, the fly-height heater may be turned on to a high power to preheat the head before reading and then left at the high power to maintain relatively the same fly-height throughout the read process.

The first area type on disk 150 may include zones or portions where data is written in wider tracks than in other zones or portions of a second area type where data is written in narrower tracks. The first area type may therefore use a lower energy level to read and write data than in the second area type, since head 136 does not need to be as close to the surface of disk 150. In other implementations, the first area type and the second area type may have tracks of similar width, but the use of a different energy level in the second area type may provide a higher accuracy for reading and/or writing data than in the first area type. In both examples, the use of the different energy level in the second area type can add to the amount of time needed to perform commands in the second area type on average as compared to the first area type due to additional maintenance operations that may be needed due to the different energy level. For example, writing closer to the disk surface in the second area type using a higher energy level may require additional refreshing or rewriting of data in the second area type due to a greater amount of Adjacent Track Interference (ATI).

In the example of HAMR, a laser diode on head 136 may heat a small region of a second area type on disk 150 that is to be written by head 136. The heating of disk 150 temporarily lowers the coercivity of grains in disk 150 to allow the grains to become magnetized by head 136, before returning to a higher coercivity after cooling off. This allows the use of smaller grains (and thus a higher storage density) that require a higher coercivity to remain magnetized after being written due their smaller size. The first area type may be a storage area located on an opposite disk surface or one or more storage areas on another disk surface in DSD 106 that do not use HAMR or use a lower energy level, which may allow for commands to be performed quicker on average due to less maintenance or background operations needed in the first area type. Controller 120 may then prioritize commands performed in the first area type with a lower energy level over commands performed in the second area type to improve a performance density.

In the example of MAMR, head 136 can include a Spin Torque Oscillator (STO) to generate a microwave field that allows the disk to be more easily magnetized with a lower magnetic field so that a higher storage density can be achieved. However, as with TFC and HAMR, the use of this energy-assisted recording for MAMR is associated with an overall increased time to perform commands due to additional operations needed to be performed. In one implementation, a second area type can include a disk surface as a storage area of DSD 106 that uses MAMR, while a first area type can include a disk surface as a storage area of DSD 106 that does not use MAMR. Controller 120 may then prioritize commands performed in the first area type over commands performed in the second area type to improve a performance density.

As another example of how the first area type and the second area type may differ in terms of data access methodologies, the first area type and the second area type may use different sector sizes that change the amount of time to perform commands in the respective area types. For example, the first area type may include smaller sectors of 512 bytes, while the second area type may include larger sectors of 4,096 bytes (i.e., a 4K sector). Although the larger sector size of the second area type provides for a greater storage capacity in a given area on the disk and can provide for stronger error correction, the performance of commands in the second area type on average take longer than performing commands in the first area type using the smaller sector size. In one aspect, an entire 4K sector in the second area type needs to be read and/or written to perform read and write commands, as opposed to reading or writing a smaller or more granular 512 byte sector in the first area type. There is also processing involved in extracting portions of a larger 4K sector when performing read commands or rewriting a full 4K sector to modify a portion of the sector to accommodate a non-native 4K or 512 byte operating system at host 101.

In another example of different data access methodologies used for the first area type and the second area type, disk 150 may use different amounts of error correction for the first and second area types. For example, sectors in the first area type may include less data for Error Correcting Code (ECC) than sectors in the second area type for checking or correcting the data read in the sector. This can ordinarily allow for commands to performed quicker in the first area type than in the second area type, but the error correction in the second area type is stronger than in the first area type.

In yet another example of different data access methodologies used for the first area type and the second area type, disk 150 may include areas with different data densities in a radial direction across tracks and/or in a circumferential direction along tracks. For example, the first area type may include a lower TPI with wider tracks and/or more space between the tracks, or a lower Bits Per Inch (BPI) along the tracks in the first area type. The second area type with a greater areal data density in terms of TPI and/or BPI may require a greater amount of maintenance operations that can add to the overall amount of time needed to perform commands in the second area type as compared to the first area type. For example, a greater areal data density in the second area type may require additional refreshing or rewriting of data in the second area type due to a greater amount of ATI.

As noted above, DSD 106 may include more than two area types corresponding to more than two different data access methodologies for reading and writing data. In addition, the first area type and the second area type may differ in more than one aspect, such as where the first area type is written using CMR and less error correction and the second area type is written using SMR and more error correction. The area types may also differ in terms of storage media such as where the first area type includes storage areas in flash memory 142 and the second area type includes storage areas on disk 150.

In addition, and as discussed in more detail below with reference to FIG. 4, host 101 or DSD 106 may configure the storage areas on disk 150 or in flash memory 142 for different area types based at least in part on a target performance density (e.g., target performance density 16 or 24 in FIG. 1). For example, DSD 106 may be a dynamic hybrid SMR DSD that is capable of dynamically converting certain storage areas from being written with overlapping tracks as an SMR realm or second area type into being written with non-overlapping tracks as a CMR realm or first area type, and vice-versa. Such dynamically convertible DSDs are described in more detail in co-pending U.S. patent application Ser. No. 16/024,211, filed on Jun. 29, 2018, and entitled "DYNAMIC HYBRID SHINGLED MAGNETIC RECORDING", the contents of which are hereby incorporated by reference in its entirety.

As shown in the example of FIG. 1, flash memory 142 includes different blocks such as blocks 144 and 146 for storing data. In more detail, block 144 may be configured as an SLC block, while block 146 may be configured as an MLC block so as to provide two different storage area types where data is accessed using different data access methodologies to read or write data. As will be appreciated by those of ordinary skill in the art, MLC blocks (i.e., storage areas of a second area type) may store more data in a given physical space by using multiple levels, but data in SLC blocks (i.e., storage areas of a first area type) can be read and written quicker than MLC blocks. In other implementations, the storage areas may correspond to larger areas than a block, such as dies that are either SLC or MLC.

As discussed in more detail below, DSD 106 may prioritize commands to be performed in storage areas of the first area type over commands to be performed in storage areas of the second area type to improve a performance metric representing a number of data access operations performed within a predetermined period of time for a storage capacity of DSD 106, such as an IOPS density. In addition, host 101 or DSD 106 may configure the blocks or storage areas in flash memory 142 based at least in part on a target performance density (e.g., target IOPS density 16 or 24).

While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistive RAM (RRAM), NAND memory (e.g., Single-Level Cell (SLC) memory, Multi-Level Cell (MLC) memory (i.e., two or more levels), or any combination thereof), NOR memory, EEPROM, Ferroelectric Memory (FeRAM), Magnetoresistive RAM (MRAM), other discrete NVM chips, or any combination thereof. Other implementations of DSD 106 may include a different type of solid-state memory than flash memory.

Those of ordinary skill in the art will appreciate that other embodiments can include more or less than the elements shown in FIG. 1, and that the disclosed processes can be implemented in other environments. For example, other embodiments can include a different number of hosts or DSDs, a different number of disks 150, or only one storage area configuration, performance density, or target performance density stored at one of host 101 or DSD 106.

Figure 2:
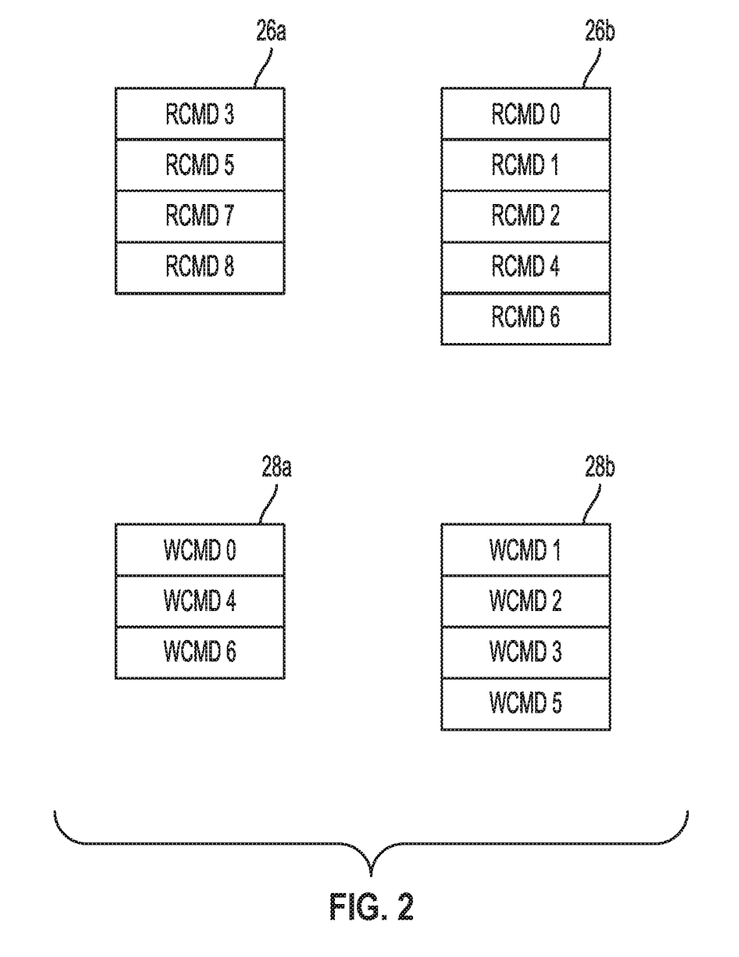
FIG. 2 illustrates the scheduling of read and write commands for performance in different area types according to an embodiment.

FIG. 2 illustrates the scheduling of read and write commands for performance in different area types according to an embodiment. As shown in the top half of FIG. 2, read command queue 26a is used to schedule read commands to be performed in a first area type and read command queue 26b is used to schedule read commands to be performed in a second area type.

In one implementation, read commands (RCMDs in FIG. 2) 3, 5, 7, and 8 in read command queue 26a can be for performance in the first area type of CMR zones on disk 150 of non-overlapping tracks, such as CMR zone 152. RCMDs 0, 1, 2, 4, and 6 in read command queue 26b can be for performance in the second area type of SMR zones on disk 150 of overlapping tracks, such as SMR zone 154. To increase a current performance density, such as an IOPS density, toward a target performance density, controller 120 may prioritize the performance of one or more read commands in read command queue 26a for the first area type over one or more read commands in read command queue 26b for the second area type.

As noted above, read commands in the CMR zones of the first area type may on average be performed quicker than the read commands in the SMR zones of the second area type.

Controller 120 may also consider other factors such as the relative radial location of commands in ordering or scheduling of the commands in the two different read queues. Such ordering or scheduling may be part of a Rotational Position Optimization (RPO) algorithm. For example, controller 120 may use an RPO algorithm to order performance of the commands from read queue 26a for the first area type, and then add in commands from read queue 26b for the second area type when time permits.

In the example where the read commands of read queues 26a and 26b are to be performed flash memory 142, RCMDs 3, 5, 7, and 8 in read command queue 26a can be for performance in the first area type of SLC blocks in flash memory 142, such as SLC block 144. RCMDs 0, 1, 2, 4, and 6 in read command queue 26b can be for performance in the second area type of MLC blocks, such as MLC block 146. To increase a current performance density toward a target performance density, controller 120 prioritizes the performance of one or more read commands in read command queue 26a for the first area type over one or more read commands in read command queue 26b for the second area type. As noted above, the access of data in the first area type of the SLC blocks may on average be performed quicker than in the MLC blocks of the second area type.

As shown in the bottom half of FIG. 2, write command queue 28a is used for scheduling write commands to be performed in a first area type and write command queue 28b is used to schedule write commands to be performed in a second area type. Although separate command queues are shown for the first area type and the second area type in the example of FIG. 2, other implementations may include only a single read command queue and a single write command queue, but prioritize the commands to be performed in the first area type by flagging or otherwise identifying the commands to be performed in the first area type.

In the example of FIG. 2, host 101 may indicate a priority of data in commands using a flag or particular logical addresses (e.g., Logical Block Address (LBA) ranges) for higher priority data, which controller 120 may use to determine to write such data in the first area type. For example, frequently accessed data (i.e., "hot data") may be prioritized by host 101 so that controller 120 writes such prioritized data in the first area type, while infrequently accessed data (i.e., "cold data") may be not be prioritized so that controller 120 determines to write such unprioritized data in the second area type. In some implementations, host 101 may also prioritize data based on factors other than whether the data is expected to be accessed frequently, such as whether the data is to be accessed quickly despite its frequency of access.

In one implementation, write commands (WCMDs in FIGS. 2) 0, 4, and 6 in write command queue 28a are for performance in the first area type of CMR zones on disk 150 of non-overlapping tracks, such as CMR zone 152. WCMDs 1, 2, 3, and 5 in write command queue 28b are for performance in the second area type of SMR zones on disk 150 of overlapping tracks, such as SMR zone 154. To increase a performance density toward a target performance density, controller 120 may prioritize the performance of one or more write commands in write command queue 28a for the first area type over one or more write commands in write command queue 28b for the second area type.

As noted above, the write commands in the CMR zones of the first area type can ordinarily be performed quicker than the write commands in the SMR zones of the second area type. This can be due to the ability of the CMR zones to accommodate a write-in-place data access methodology where data does not have to be written sequentially as in the SMR zones of the second area type. The address indirection and overall performance penalty that may be associated with changes made to previously written data when writing data in the second area type of the SMR zones or storage areas can decrease performance in terms of the number of commands that can be performed in a predetermined period of time, thereby reducing the performance density.

In the example of flash memory 142, WCMDs 0, 4, and 6 in write command queue 28a can be for performance in the first area type of SLC blocks in flash memory 142, such as SLC block 144. WCMDs 1, 2, 3, and 5 in write command queue 28b can be for performance in the second area type of MLC blocks, such as MLC block 146. To increase a current performance density toward a target performance density, controller 120 may prioritize the performance of one or more write commands in write command queue 28a for the first area type over one or more write commands in write command queue 28b for the second area type. As noted above, the access of data in the first area type of the SLC blocks may ordinarily be performed quicker than in the MLC blocks of the second area type.

In some implementations, each of disk 150 and flash memory 142 may have two write command queues for a total of four write command queues and two read command queues for a total of four read command queues for prioritizing the performance of commands in a first area type over a second area type. In implementations where DSD 106 includes only one type of non-volatile storage (e.g., only disk 150 or flash memory 142), read command queues 26 and write command queues 28 may each include two command queues for prioritizing commands for one area type over another area type. In yet other implementations where there are more than two different area types, separate command queues may be used for each of the different area types, such as by having three different read command queues 26 and three different write command queues 28 for three different area types having different relative priorities for adjusting a performance density.

Example Processes

Figure 3:
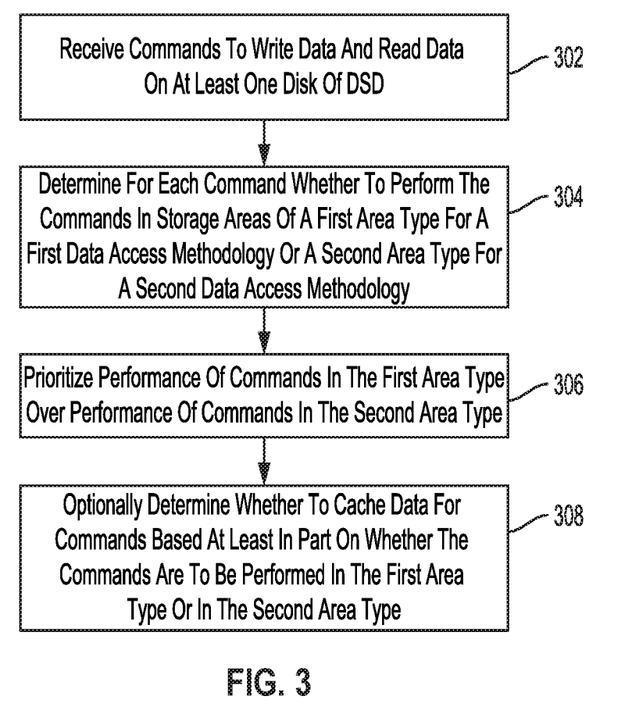
FIG. 3 is a flowchart for a command prioritization process according to an embodiment.

FIG. 3 is a flowchart for a command prioritization process according to an embodiment. The command prioritization process of FIG. 3 can be performed, for example, by controller 120 executing firmware 18. Although the process of FIG. 3 is directed to an embodiment where commands are performed in area types on one or more disks, the process of FIG. 3 can be applied in other embodiments to different types of storage media with multiple area types, such as to solid-state memory 142, which includes a first area type of SLC blocks and a second area type of MLC blocks.

In block 302, DSD 106 receives commands to read data and write data on at least one disk (e.g., disk 150). The commands can include requests to write user data or metadata, such as from an application or operating system executed by processor 102 of host 101.

In block 304, controller 120 determines for each command whether to perform the commands in areas of a first area type for a first data access methodology or in a second area type for a second data access methodology. As discussed above with reference to FIGS. 1 and 2, the first data access methodology of the first area type may differ from the second data access methodology of the second area type, for example, in terms of one or more of whether the tracks in such area types are overlapping or non-overlapping (i.e., SMR or CMR), an energy level used for energy-assisted recording (e.g., an amount of heating for TFC), a sector size (e.g., 512 byte or 4K sectors), an areal data density (e.g., TPI or BPI), and different amounts of error correction (e.g., more ECC per sector in the second area type). The determination in block 304 on whether to perform the commands in areas of the first area type or the second area type can be based on, for example, a logical address (e.g., an LBA) for the data of the command or a priority level for the command.

For example, a logical address may be provided with a command received from host 101 indicating a starting address or an address range for the data to be written or read on disk 150. As understood by those of ordinary skill in the art, this address information from the command can be translated by controller 120 into corresponding physical addresses (e.g., Physical Block Addresses (PBAs)) for reading or writing the data on disk 150 for the command. The logical address or addresses for the command can determine whether the command is performed in a storage area of disk 150 of the first area type (e.g., a CMR zone) or of the second area type (e.g., an SMR zone).

In some cases, a priority level of the command or of the data can indicate whether the command is to be performed in the first area type or in the second area type. Host 101 may indicate that a command or the data to be written or read for the command has a high priority, such as whether the command is for booting an operating system of host 101, is expected to be frequently accessed (i.e., hot data), or has been prioritized by an application for quicker access than other data. In the example of disk 150, such data may be stored, for example, in a zone located in the OD portion of disk 150, since reading and writing data in OD zones is associated with a faster data transfer rate due to the greater circumference of disk 150 in the OD portion as compared to the MD or ID portions, which allows for more data to be accessed by head 136 per revolution of disk 150.

In block 306, the performance of commands in the first area type are prioritized over the performance of commands in the second area type. The prioritization in block 306 can be performed by, for example, scheduling performance of the command ahead of at least one other command to be performed in the second area type using at least one of an RPO algorithm and one or more command queues, as with read command queues 26a and 26b and write command queues 28a and 28b discussed above for FIG. 2.

In this regard, controller 120 may prioritize performance of a command for the first area type by setting a shorter command timeout for commands to be performed in the first area type than for commands to be performed in the second area type. The command timeout can be used to ensure that commands are performed before the command timeout. Setting a shorter command timeout for commands to be performed in the first area type than for commands to be performed in the second area type shortens the window of time during which the commands in the first area type can be performed, thereby prioritizing such commands over other commands for the second area type having a longer command timeout.

Additionally or alternatively, controller 120 may prioritize the performance of a command in the first area type by reducing or eliminating the amount of data that is read immediately before performing the command (i.e., the amount of "prefetch" data) as compared to commands for the second area type. For example, read commands to be performed in the first area type may be prioritized by reducing or eliminating the number of sectors read before reading data in the sector where the data requested by the command is located, as compared to the number of sectors prefetched for read commands performed in the second area type. The reduced amount of prefetched data for commands in the first area type can ordinarily improve the processing speed for read commands in the first area type as compared to read commands performed in the second area type.

In block 308, controller 120 optionally determines whether to cache data for commands based at least in part on whether the commands are to be performed in the first area type or in the second area type. Accessing data in the second area type may on average take longer than accessing data in the first area type due to differences in the data access methodologies and/or additional operations needed for the second area type. Controller 120 may therefore bias its read and/or write caching policies for caching data in read cache 30 or write cache 32 based at least in part on whether the data is to be read or written in the first area type or the second area type.

In one example, data to be written in the second area type where the second data access methodology is SMR may be more likely to be cached in write cache 32 since performing such write commands may on average take longer than performing commands in the first area type where CMR is used. DSD 106 can improve performance in terms of IOPS by reporting the completion of such write commands for the first area type to host 101 upon storing data for the command in write cache 32 and deferring performance of the write command in the first area type. Similarly, data stored in a second area type with a longer expected read latency than data stored in a first area type may be more likely to be cached in read cache 30 to allow for faster access of such data from read cache 30 than from the second area type, and thereby improve performance density.

Figure 4:
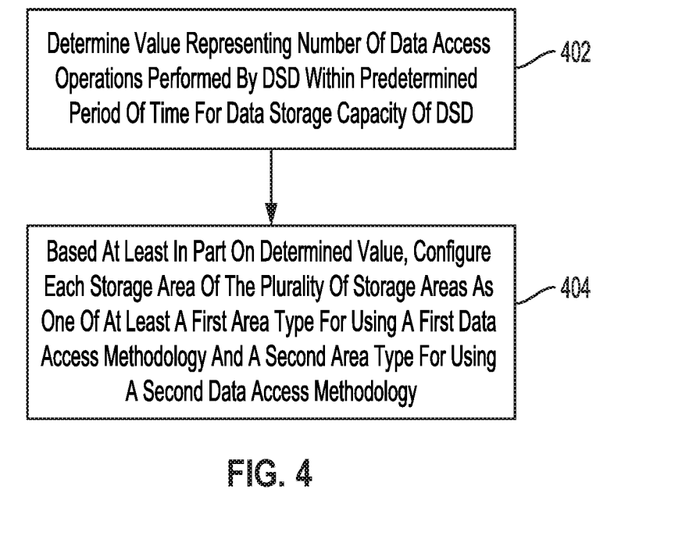
FIG. 4 is a flowchart for a storage area configuration process according to an embodiment.

FIG. 4 is a flowchart for a storage area configuration process according to an embodiment. The process of FIG. 4 can be performed, for example, by processor 102 of host 101 executing DSD driver 10. In other implementations, the process of FIG. 4 can be performed by controller 120 of DSD 106 executing firmware 18. The process of FIG. 4 may be performed as part of a manufacturing or configuration process before the DSD leaves the factory to configure or set the relative number of storage areas of the first area type to the number of storage areas of the second area type based on a desired or target performance density. The process of FIG. 4 may additionally or alternatively be performed periodically throughout the operating life of DSD 106 in the field to reconfigure or adjust the relative number of storage areas of the first area type to the number of storage areas of the second area type based on a desired or target performance density.

In some implementations, the process of FIG. 4 may be initiated in response to a user request at host 101 or in response to a measured or determined performance density reaching a threshold performance density. Although the example process of FIG. 4 is described in the context of a single DSD, other implementations can similarly configure storage areas for different area types in multiple DSDs, such as in a server environment.

In block 402, processor 102 determines a value representing a number of data access operations performed by DSD 106 within a predetermined period of time for a data storage capacity of DSD 106. In some implementations, the determination in block 402 may be performed as part of a manufacturing process for the DSD where the DSD is configured for operation before leaving the factory. In such implementations, the data storage capacity of DSD 106 may be used with an expected performance representing a number of data access operations expected to be performed within a predetermined period of time. In other implementations, the value determined in block 402 may be based on an actual performance of DSD 106 in the field representing a number of data access operations that have been performed by DSD 106 within a predetermined period of time.

In some cases, the value determined in block 402 can represent an IOPS density based on the combined non-volatile storage capacity of DSD 106 that includes the nominal or actual storage capacities of disk 150 and flash memory 142. In other implementations, the storage capacity for determining the value may be for only one type of storage media in DSD 106, such as for only disk 150 or flash memory 142, as in an implementation where the process of FIG. 4 is only practiced on disk 150 but not on flash memory 142.

Host 101 may keep track of the number of command completions returned to it from DSD 106 to determine the value. In other implementations, DSD 106 may determine the value and then provide host 101 with the value for block 402. In yet other implementations where the process of FIG. 4 is performed by DSD 106 without involvement from host 101, controller 120 may determine the value in block 402 without sending the value to host 101 or determining the value at host 101.

For subsequent iterations of the process of FIG. 4, processor 102 determines in block 402 an updated value representing an updated number of data access operations performed by DSD 106 within the predetermined time period for an updated data storage capacity of DSD 106. The value or indication of a performance density may change for subsequent iterations based on one of or both of recent command performance and an updated storage capacity since a previous iteration of the process.

The storage capacity of DSD 106 or of one of its non-volatile memories may change during operation as storage areas are configured or allocated in the field for the first area type or the second area type. The value determined in block 402 may therefore be updated in subsequent iterations of the process. For example, more SMR zones on disk 150, which can correspond to the second area type, can increase the storage capacity of disk 150, while more CMR zones corresponding to the first area type will decrease the storage capacity due to the wider tracks on disk 150 for the first area type. Similarly, more MLC blocks in flash memory 142, which can correspond to the second area type, will increase the storage capacity of flash memory 142, while more SLC blocks corresponding to the first area type will decrease the storage capacity due to the lower amount of data being stored in a given block for the first area type.

In block 404, processor 102 configures each storage area of the plurality of storage areas of disk 150 and/or flash memory 142 as one of at least a first area type for using a first data access methodology and a second area type for using a second data access methodology. In some implementations, processor 102 or controller 120 may compare the value determined in block 402 to a threshold value representing a minimum number of data access operations performed by DSD 106 within the predetermined period of time for the data storage capacity (e.g., a minimum or floor IOPS density). A number of storage areas of the first and/or second area type or a ratio based on a number of storage areas of the first area type and a number of storage areas of the second area type may be set based on the comparison.

In configuring the storage areas, processor 102 or controller 120 may set or adjust storage area configuration 12 or storage area configuration 20, respectively. As discussed above, the storage area configuration can include indications of the locations of storage areas, such as with starting logical and/or physical addresses, and indications of whether the storage areas are of the first area type or the second area type. In subsequent iterations of the process of FIG. 4, processor 102 reconfigures one or more storage areas to a different area type from a current area type to use a different data access methodology in the one or more storage areas.

Figure 5:
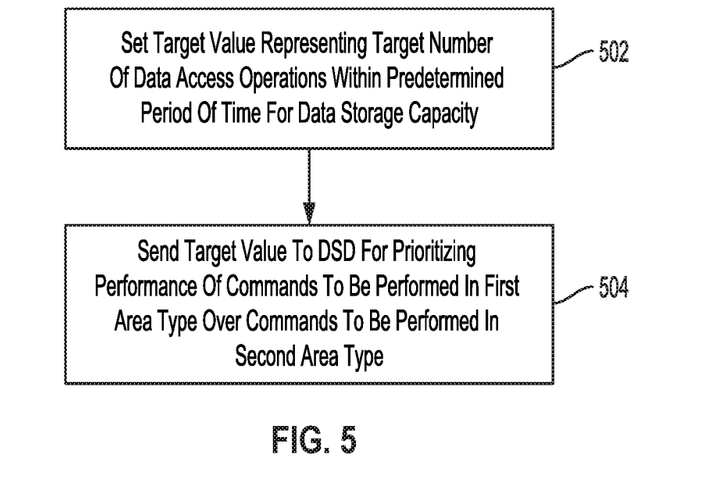
FIG. 5 is a flowchart for a target performance process according to an embodiment.

FIG. 5 is a flowchart for a target performance process according to an embodiment. The process of FIG. 5 can be performed by, for example, by processor 102 of host 101 executing DSD driver 10. The process of FIG. 5 may also be performed periodically throughout the operating life of DSD 106 to adjust the degree of prioritization of the performance of commands in the first area type over the second area type to reach a target IOPS density or other value representing a number of data access operations performed by DSD 106 within a predetermined period of time for a storage capacity of DSD 106. In some implementations, the process of FIG. 5 may be performed in response to a user request at host 101 or in response to a determined or measured performance density reaching a threshold performance density. Although the example process of FIG. 5 is described in the context of a single DSD, other implementations can similarly set a target value for multiple DSDs, such as in a server environment.

In block 502, a target value is set for DSD 106 representing a target number of data access operations within a predetermined period of time for a storage capacity of DSD 106. In some implementations, the target value can correspond to a target IOPS density. The target value can be set by an application executed at host 101, such as DSD driver 10, which may rely on a user input for a desired performance density.

In block 504, host 101 sends the target value to DSD 106 for prioritizing performance of commands to be performed in a first area type over commands to be performed in a second area type. In response, controller 120 of DSD 106 may reconfigure the number of storage areas of the first area type or of the second area type and/or may adjust the degree or amount of prioritization of commands for the first area type over commands for the second area type. For example, to increase a measured or determined IOPS density from 10 (e.g., 100 IOPS per 10 TB) toward a target value of 11, controller 120 may perform the configuration process of FIG. 4 to reconfigure storage areas of the second area type to storage areas of the first area type. Similarly, an IOPS density can be increased over time by controller 120 reconfiguring storage areas of the first area type to storage areas of the second area type.

In other examples, controller 120 in response to receiving the target value from host 101, may adjust or tune the prioritization of commands by changing a command timeout for commands to be performed in the first area type or in the second area type. In more detail, decreasing the command timeout for commands to be performed in the first area type can increase the priority of such commands so that more of these commands are performed ahead of commands to be performed in the second area type. The overall faster performance of commands in the first area type then increases the performance density for DSD 106. The command timeout for commands in the first area type can conversely be increased or the command timeout for commands in the second area type can be decreased to lower the relative priority of the commands in the first area type and reduce the performance density over time. Such a reduction in performance density may be desired in situations where a greater storage capacity and/or storage reliability is provided by the second area type than by the first area type and there is a need to conserve storage space and/or improve the reliability of the stored data.

In other examples, the relative priority of the commands for the two area types may be adjusted by changing the amount of data that is prefetched or read before performing commands in the first area type. As discussed above, reducing or eliminating the amount of data read before performing a command can shorten the time to perform the command, resulting in a greater performance density.

The foregoing arrangement of prioritizing commands for a first storage area type over another storage area type can ordinarily allow for the tuning or customization of a performance density (e.g., an IOPS density), without having to waste storage space such as by de-stroking or having to use a greater number of smaller capacity DSDs at a higher overall cost and with a greater physical footprint. In addition, reconfiguring storage areas of a DSD for a first area type or a second area type can ordinarily allow for the tuning of the performance density at various times to meet different workloads throughout the life of a DSD.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a DSP, an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive.

What is claimed is:

1. A method for configuring a Data Storage Device (DSD), the method comprising:
    determining an indication of Input/Output Operations Per Second (IOPS) density for the DSD based on a data storage capacity of the DSD;
    based at least in part on the determined indication of Input/Output Operations Per Second (IOPS) density, configuring a plurality of storage areas of the DSD,
    wherein each storage area of the plurality of storage areas is configured as one of at least a first area type for using a first data access methodology to read or write data and a second area type for using a second data access methodology to read or write data, the first data access methodology differing from the second data access methodology and the first area type being different from the second area type;
    setting a target indication of Input/Output Operations Per Second (IOPS) density for the DSD; and
    sending the target indication to the DSD, wherein the DSD is configured to prioritize performance of commands to be performed in the first area type over commands to be performed in the second area type based on the target indication.

2. The method of claim 1, wherein in configuring the plurality of storage areas, the method further comprises comparing the determined indication of Input/Output Operations Per Second (IOPS) density to a threshold for a minimum Input/Output Operations Per Second (IOPS) density.

3. The method of claim 1, wherein in configuring the plurality of storage areas, the method further comprises setting a number of storage areas of the first area type or setting a ratio based on a number of storage areas of the first type and a number of storage areas of the second type.

4. The method of claim 1, wherein subsequent to operation of the DSD following determining the indication of Input/Output Operations Per Second (IOPS) density, the method further comprises:
    determining an updated indication of Input/Output Operations Per Second (IOPS) density; and
    based at least in part on the determined updated indication of Input/Output Operations Per Second (IOPS) density, reconfiguring one or more storage areas of the plurality of storage areas to a different area type from a current area type to use a different data access methodology to read or write data.

5. The method of claim 1, wherein the first data access methodology includes Conventional Magnetic Recording (CMR) where data is written in non-overlapping tracks on at least one disk of the DSD and the second data access methodology includes Shingled Magnetic Recording (SMR) where data is written in overlapping tracks on the at least one disk of the DSD.

6. The method of claim 1, wherein the first data access methodology includes Single-Level Cell (SLC) data access in a flash memory and the second data access methodology includes Multi-Level Cell (MLC) data access in the flash memory.

7. The method of claim 1, further comprising indicating to the DSD whether to perform a command in a storage area corresponding to the first area type or the second area type based on a logical address for data of the command or a priority level for the command.

8. The method of claim 1, wherein the first data access methodology and the second data access methodology differ by using at least one of different levels of energy-assisted recording on at least one disk of the DSD, different sector sizes for storing data, different radial data densities, different linear data densities, and different amounts of error correction for stored data.

9. A Data Storage Device (DSD), comprising:
a plurality of storage areas including at least a first area type for using a first data access methodology to read or write data and a second area type for using a second data access methodology to read or write data, the first data access methodology differing from the second data access methodology and the first area type being different from the second area type; and
a controller configured to:
receive a target indication of Input/Output Operations Per Second (IOPS) density for the DSD; and
prioritize performance of commands in the first area type over commands to be performed in the second area type based on the target indication.

10. The DSD of claim 9, wherein the controller is further configured to prioritize performance of a command to be performed in the first area type by scheduling performance of the command ahead of the at least one other command to be performed in the second area type using at least one of a Rotational Position Optimization (RPO) algorithm and one or more command queues.

11. The DSD of claim 9, wherein the controller is further configured to prioritize the performance of a command to be performed in the first area type by setting a shorter command timeout for the command to be performed in the first area type than for at least one other command to be performed in the second area type.

12. The DSD of claim 9, wherein the controller is further configured to prioritize the performance of a command to be performed in the first area type by reducing or eliminating the amount of data that is read immediately before performing the command to be performed in the first area type as compared to at least one other command to be performed in the second area type.

13. The DSD of claim 9, wherein the controller is further configured to determine whether to cache data fora command based at least in part on whether the command is to be performed in the first area type or in the second area type.

14. The DSD of claim 9, wherein the controller is further configured to determine whether to perform a command in a storage area corresponding to the first area type or the second area type based on a logical address for the data of the command or a priority level for the command.

15. The DSD of claim 9, wherein the first data access methodology and the second data access methodology differ by using at least one of different levels of energy-assisted recording on at least one disk, different sector sizes for storing data on at least one disk, different areal data densities on at least one disk, and different amounts of error correction for data stored on at least one disk.

16. The DSD of claim 9, wherein the first data access methodology includes Conventional Magnetic Recording (CMR) where data is written in non-overlapping tracks and the second data access methodology includes Shingled Magnetic Recording (SMR) where data is written in overlapping tracks.

17. The DSD of claim 9, wherein the first data access methodology includes Single-Level Cell (SLC) data access in a flash memory and the second data access methodology includes Multi-Level Cell (MLC) data access in the flash memory.

18. A host, comprising:
an interface configured to communicate with a Data Storage Device (DSD); and
a processor configured to:
determine a value for the DSD representing a number of data access operations within a predetermined period of time for a data storage capacity of the DSD;
based at least in part on the determined value, configure a plurality of storage areas of the DSD,
wherein each storage area of the plurality of storage areas is configured as one of at least a first area type for using a first data access methodology to read or write data and a second area type for using a second data access methodology to read or write data, the first data access methodology differing from the second data access methodology and the first area type being different from the second area type;
set a target value representing a target number of data access operations performed by the DSD within the predetermined period of time for the data storage capacity of the DSD; and
send the target value to the DSD, wherein the DSD is configured to prioritize performance of commands to be performed in the first area type over commands to be performed in the second area type based on the target value.

19. The host of claim 18, wherein in configuring the plurality of storage areas, the processor is further configured to compare the determined value to a threshold value representing a minimum number of data access operations performed by the DSD within the predetermined period of time for the data storage capacity of the DSD.

20. The host of claim 18, wherein in configuring the plurality of storage areas, the processor is further configured to set a number of storage areas of the first area type or set a ratio based on a number of storage areas of the first type and a number of storage areas of the second type.

21. The host of claim 18, wherein subsequent to operation of the DSD following determining the value, the processor is further configured to:
determine an updated value representing an updated number of data access operations performed by the DSD within the predetermined period of time for an updated data storage capacity of the DSD; and
based at least in part on the determined updated value, reconfigure one or more storage areas of the plurality of storage areas to a different area type from a current area type to use a different data access methodology to read or write data.

22. The host of claim 18, wherein the first data access methodology includes Conventional Magnetic Recording (CMR) where data is written in non-overlapping tracks on at least one disk of the DSD and the second data access methodology includes Shingled Magnetic Recording (SMR) where data is written in overlapping tracks on the at least one disk of the DSD.

23. The host of claim 18, wherein the first data access methodology includes Single-Level Cell (SLC) data access in a flash memory and the second data access methodology includes Multi-Level Cell (MLC) data access in the flash memory.

24. The host of claim 18, wherein the processor is further configured to indicate to the DSD whether to perform a command in a storage area of the first area type or the second area type based on a logical address for data of the command or a priority level for the command.

25. The host of claim 18, wherein the first data access methodology and the second data access methodology differ by using at least one of different levels of energy-assisted recording on at least one disk of the DSD, different sector sizes for storing data, different areal data densities, and different amounts of error correction for stored data.

26. A Data Storage Device (DSD), comprising:
at least one disk for storing data in a plurality of storage areas, wherein the plurality of storage areas includes at least a first area type for using a first data access methodology to read or write data and a second area type for using a second data access methodology to read or write data, the first data access methodology differing from the second data access methodology and the first area type being different from the second area type; and
a controller configured to:
receive a command to write data or read data on the at least one disk;
determine whether to perform the command in a storage area of the first area type or the second area type; and
in response to determining that the command is to be performed in a storage area of the first area type, prioritize performance of the command in the first area type over at least one other command to be performed in the second area type by reducing or eliminating the amount of data that is read immediately before performing the command to be performed in the first area type as compared to the at least one other command to be performed in the second area type.

27. A method, comprising:
receiving a command to write data or read data on at least one disk of a Data Storage Device (DSD), wherein the at least one disk includes a plurality of storage areas of at least a first area type for using a first data access methodology to read or write data and a second area type for using a second data access methodology to read or write data, the first data access methodology differing from the second data access methodology and the first area type being different from the second area type;
determining whether to perform the command in a storage area of the first area type or the second area type; and
in response to determining that the command is to be performed in a storage area of the first area type, prioritizing performance of the command in the first area type over at least one other command to be performed in the second area type by reducing or eliminating the amount of data that is read immediately before performing the command to be performed in the first area type as compared to the at least one other command to be performed in the second area type.

28. A method, comprising:
determining a value for a Data Storage Device (DSD) representing a number of data access operations within a predetermined period of time for a data storage capacity of the DSD;
based at least in part on the determined value, configuring a plurality of storage areas of the DSD,
wherein each storage area of the plurality of storage areas is configured as one of at least a first area type for using a first data access methodology to read or write data and a second area type for using a second data access methodology to read or write data, the first data access methodology differing from the second data access methodology and the first area type being different from the second area type;
setting a target value representing a target number of data access operations performed by the DSD within the predetermined period of time for the data storage capacity of the DSD; and
sending the target value to the DSD, wherein the DSD is configured to prioritize performance of commands to be performed in the first area type over commands to be performed in the second area type based on the target value.

* * * * *